United States Patent
Shen et al.

(10) Patent No.: US 12,433,758 B2
(45) Date of Patent: Oct. 7, 2025

(54) EXPANDABLE SPINAL IMPLANT

(71) Applicant: INDUSTRIAL TECHNOLOGY RESEARCH INSTITUTE, Hsinchu (TW)

(72) Inventors: Hsin-Hsin Shen, Hsinchu County (TW); Pei-I Tsai, Hsinchu (TW); Chih-Chieh Huang, Miaoli County (TW); Kuo-Yi Yang, Hsinchu (TW); Shih-Ping Lin, Kaohsiung (TW); Yi-Hung Wen, Hsinchu (TW); Wei-Lun Fan, Miaoli County (TW); Shu-Fen Yeh, New Taipei (TW); Ting-Ni Huang, New Taipei (TW); An-Li Chen, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 84 days.

(21) Appl. No.: 18/396,331

(22) Filed: Dec. 26, 2023

(65) Prior Publication Data

US 2025/0177161 A1    Jun. 5, 2025

(30) Foreign Application Priority Data

Dec. 1, 2023    (TW) .................................. 112146889

(51) Int. Cl.
| | | |
|---|---|---|
| *A61F 2/44* | (2006.01) | |
| *A61F 2/30* | (2006.01) | |
| *A61L 27/14* | (2006.01) | |

(52) U.S. Cl.
CPC .. *A61F 2/4425* (2013.01); *A61F 2002/30322* (2013.01); *A61F 2002/30327* (2013.01);
(Continued)

(58) Field of Classification Search
CPC .......... A61F 2/44; A61F 2/442; A61F 2/4425; A61F 2/4455; A61F 2/447
See application file for complete search history.

(56) References Cited

U.S. PATENT DOCUMENTS

| | | | | |
|---|---|---|---|---|
| 3,941,028 A | * | 3/1976 | Lobello ................. | F16B 13/066 411/75 |
| 5,275,512 A | * | 1/1994 | Wright .................. | E21D 21/008 405/259.4 |

(Continued)

FOREIGN PATENT DOCUMENTS

| | | |
|---|---|---|
| CN | 104323873 A | 2/2015 |
| CN | 107405204 A | 11/2017 |

(Continued)

OTHER PUBLICATIONS

European Search Report issued in corresponding application No. 23220316.6, dated Jun. 25, 2024.
(Continued)

*Primary Examiner* — Eduardo C Robert
(74) *Attorney, Agent, or Firm* — Maschoff Brennan (57) ABSTRACT

An expandable spinal implant includes a flexible body, an expander component, a fastener and an anti-reverse mechanism. The flexible body includes a base portion and flexible arms each having a free end and a fixed end connecting the base portion. The flexible arms surround an installation space. The expander component is partially in the installation space and exerts pressure on the free ends to move the free ends away from one another. The fastener includes a head portion and a screw portion. The head portion and the expander component are at opposite sides of the base portion. The screw portion passes through the base portion and screwed into the expander component. The anti-reverse mechanism is fixed to the base portion and blocks one side of the head portion located away from the expander com-
(Continued)

ponent. The anti-reverse mechanism and the expander component are at opposite sides of the base portion.

17 Claims, 8 Drawing Sheets

(52) U.S. Cl.
CPC ............... *A61F 2002/30405* (2013.01); *A61F 2002/30537* (2013.01); *A61F 2002/30604* (2013.01); *A61F 2220/0041* (2013.01); *A61F 2250/0004* (2013.01); *A61F 2250/0024* (2013.01); *A61F 2250/0026* (2013.01); *A61F 2250/0039* (2013.01); *A61F 2250/0052* (2013.01); *A61F 2250/006* (2013.01); *A61F 2310/00011* (2013.01); *A61L 27/14* (2013.01)

(56) References Cited

U.S. PATENT DOCUMENTS

| | | | |
|---|---|---|---|
| 5,390,683 A * | 2/1995 | Pisharodi | A61F 2/4455 606/279 |
| 7,819,921 B2 | 10/2010 | Grotz | |
| 9,848,996 B2 * | 12/2017 | Faulhaber | A61F 2/4455 |
| 10,667,927 B2 | 6/2020 | Lamborne et al. | |
| 11,007,067 B2 | 5/2021 | Masson et al. | |
| 11,395,745 B2 | 7/2022 | Tseng et al. | |
| 11,819,420 B2 | 11/2023 | Jang et al. | |
| 2002/0143401 A1* | 10/2002 | Michelson | A61F 2/446 606/264 |
| 2009/0099568 A1 | 4/2009 | Lowry et al. | |
| 2013/0218280 A1* | 8/2013 | Zhang | A61F 2/447 623/17.16 |
| 2014/0257486 A1 | 9/2014 | Alheidt | |
| 2015/0209152 A1* | 7/2015 | Patterson | A61F 2/447 623/17.13 |
| 2017/0100255 A1* | 4/2017 | Hleihil | A61F 2/447 |
| 2021/0137699 A1* | 5/2021 | Jang | A61F 2/4455 |
| 2021/0386554 A1* | 12/2021 | Kono | A61F 2/4455 |
| 2023/0277329 A1 | 9/2023 | Walsh et al. | |
| 2023/0346569 A1 | 11/2023 | Yoon et al. | |

FOREIGN PATENT DOCUMENTS

| | | |
|---|---|---|
| TW | 201912120 A | 4/2019 |
| TW | 1678474 B | 12/2019 |
| TW | 202118456 A | 5/2021 |
| TW | 202118469 A | 5/2021 |
| WO | 2018/078450 A1 | 5/2018 |

OTHER PUBLICATIONS

TW Office Action dated Mar. 20, 2024 as received in Application No. 112146889.

* cited by examiner

EXPANDABLE SPINAL IMPLANT

CROSS-REFERENCE TO RELATED APPLICATIONS

The present application is based on, and claims priority from, Taiwan Application Serial Number 112146889, filed on Dec. 1, 2023 the disclosure of which is hereby incorporated by reference herein in its entirety.

TECHNICAL FIELD

This disclosure relates to a spinal implant.

BACKGROUND

The intervertebral disc, positioned between the vertebrae, plays a pivotal role in distributing forces throughout the spine. It comprises two primary components which are the outer annulus fibrosus and the inner nucleus pulposus. The outer annulus fibrosus consists of multiple layers of collagen fibers, while the inner nucleus pulposus is a gel-like substance. This structural combination, with the harder outer layer surrounding the softer inner core, makes the intervertebral disc an effective weight-bearing and shock-absorbing mechanism. However, in the event of injury, the intervertebral disc may become a potential source of discomfort and pain.

SUMMARY

One embodiment of the disclosure provides an expandable spinal implant configured to be inserted between two vertebrae. The expandable spinal implant includes a flexible body, an expander component, a fastener and an anti-reverse mechanism. The flexible body includes a base portion and a plurality of flexible arms. Each of the flexible arms has a fixed end and a free end opposite to each other, the fixed ends of the flexible arms are connected to the base portion, and the flexible arms collectively surround an installation space. The expander component is partially disposed in the installation space and exerts pressure on the free ends of the flexible arms, such that the free ends are moved in directions away from one another. The fastener includes a head portion and a screw portion connected to each other. The head portion and the expander component are located on two opposite sides of the base portion, respectively. The screw portion is disposed through the base portion and screwed into the expander component. The anti-reverse mechanism is fixed to the base portion. The anti-reverse mechanism and the expander component are located on the two opposite sides of the base portion, respectively. The anti-reverse mechanism blocks one side of the head portion of the fastener located away from the expander component.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
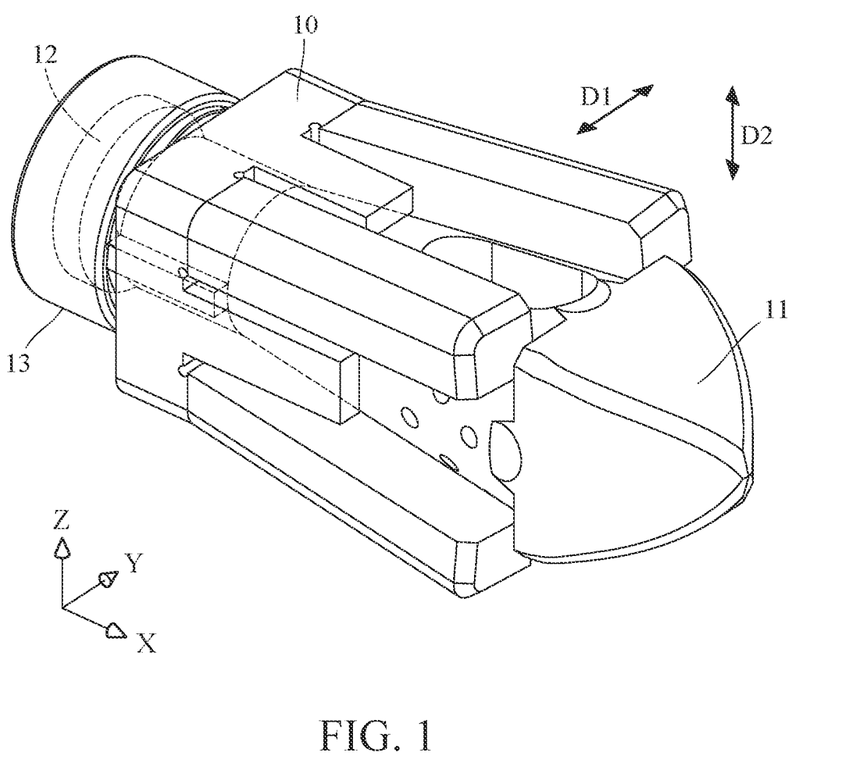
FIG. 1 is a perspective view of an expandable spinal implant in accordance with the first embodiment of the disclosure.
Figure 2:
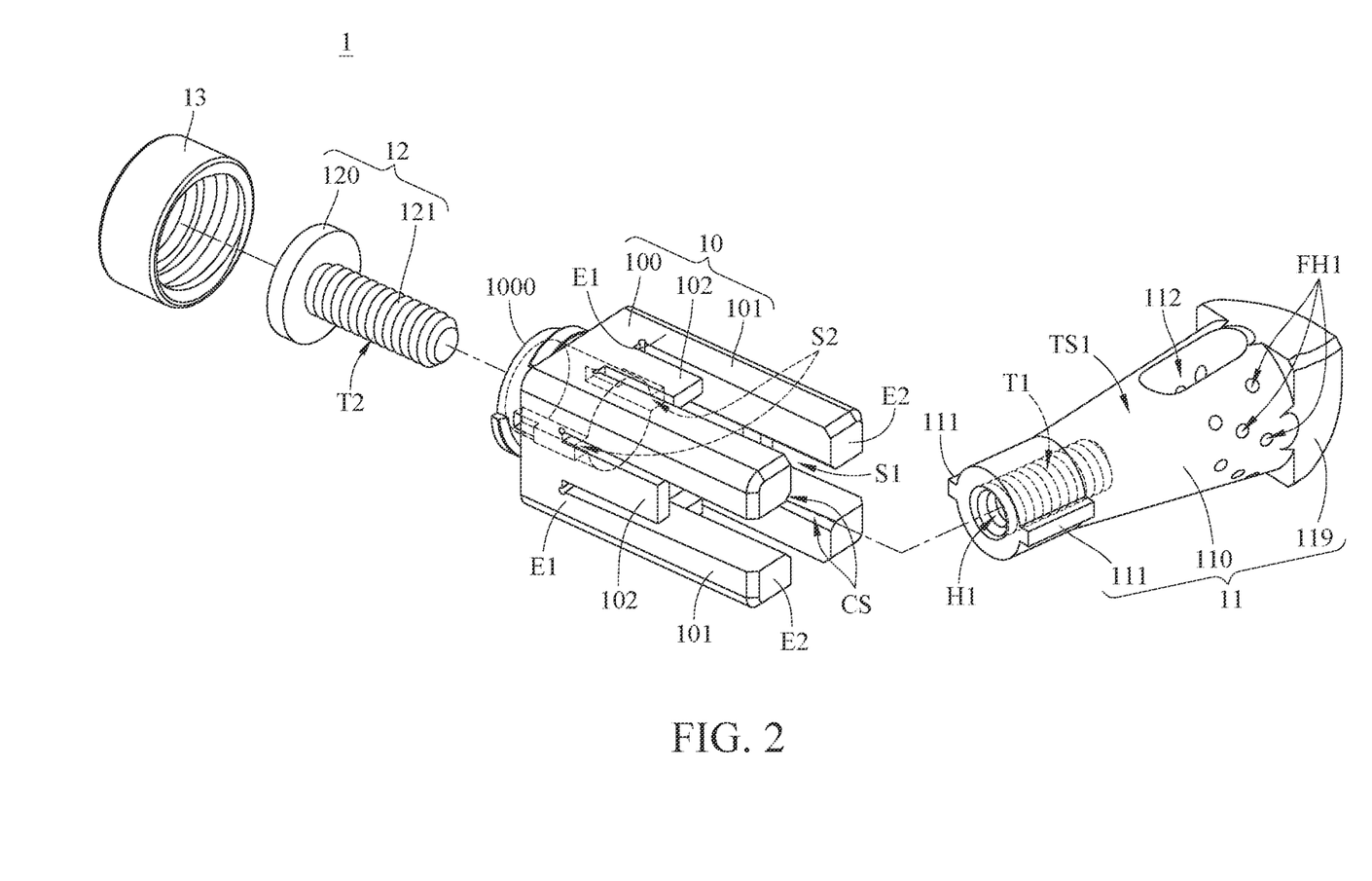
FIG. 2 is an exploded view of the expandable spinal implant in FIG. 1.
Figure 3:
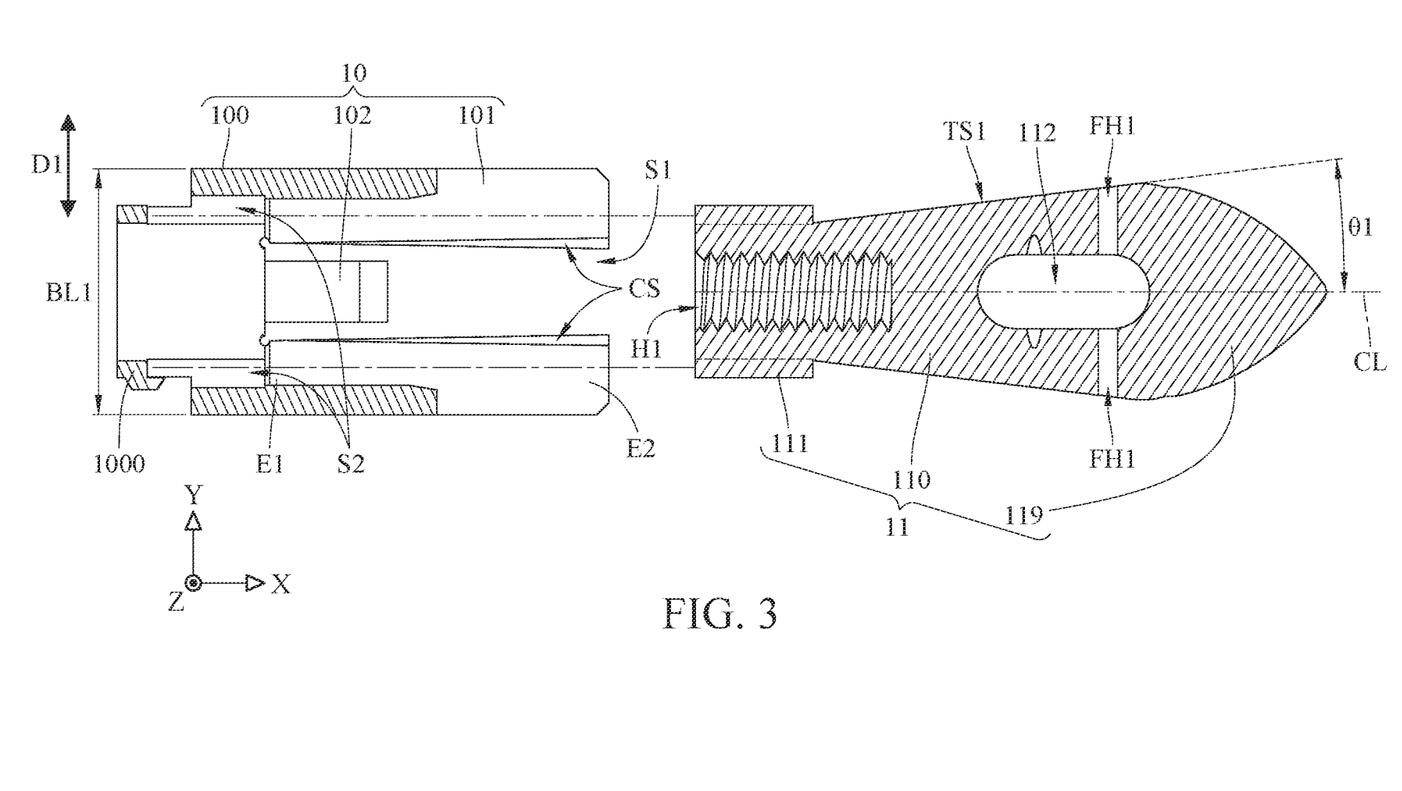
FIG. 3 is an exploded and cross-sectional view of a flexible body and an expander component of the expandable spinal implant in FIG. 1.

Please refer to FIG. 1 to FIG. 3. FIG. 1 is a perspective view of an expandable spinal implant in accordance with the first embodiment of the disclosure, FIG. 2 is an exploded view of the expandable spinal implant in FIG. 1, and FIG. 3 is an exploded and cross-sectional view of a flexible body and an expander component of the expandable spinal implant in FIG. 1.

In this embodiment, an expandable spinal implant 1 is provided. The expandable spinal implant 1 is configured to be inserted between two vertebrae (not shown in figures). The expandable spinal implant 1 includes a flexible body 10, an expander component 11, a fastener 12 and an anti-reverse mechanism 13.

The expander component 11 may include a metallic material such as stainless steel (e.g., 316L, 404, 420J2, or 17-4), titanium alloy (e.g., $Ti_6Al_4V$), cobalt-chromium alloy, iron-based alloy, magnesium-based alloy, nickel alloy (e.g., Inconel 718), or aluminum alloy (e.g., $AlSi_{10}Mg$). Furthermore, the expander component 11 may be manufactured through various processing methods such as casting, metal stamping, computer numerical control (CNC) machining, and additive manufacturing.

The flexible body 10 may include a polymeric material such as carbon fiber-reinforced polymer (CFRP), polyetheretherketone (PEEK), or polyetherketoneketone, (PEKK). Furthermore, the flexible body 10 may be manufactured through various processing methods such as injection molding, extrusion molding, membrane pressing, hot pressing, blow molding, moulding, winding molding, prepreg stacking, transfer molding, foaming, casting, and additive manufacturing.

The flexible body 10 includes a base portion 100, four flexible arms 101 and four rigid side plates 102. Each of the flexible arms 101 has a fixed end E1 and a free end E2. The fixed ends E1 of the flexible arms 101 are connected to the base portion 100, and the flexible arms 101 collectively surround an installation space S1. The base portion 100 of the flexible body 10 has two guiding grooves S2 connected to the installation space S1, and the two guiding grooves S2 extend in a direction parallel to a central axis CL of the expander component 11. The rigid side plates 102 are connected to the base portion 100, each of the rigid side plates 102 is located between adjacent two of the flexible arms 101, and a length of each of the rigid side plates 102 is smaller than a length of each of the flexible arms 101; therefore, by incorporating the rigid side plates 102 in the flexible body 10, the structural strength of the flexible body 10 is enhanced. However, the rigid side plates 102 are optional, and the present disclosure is not limited thereto. In some embodiments of the present disclosure, the flexible body may not have a rigid side plate.

The expander component 11 is partially disposed in the installation space S1 of the flexible body 10 and exerts pressure on the free ends E2 of the flexible arms 101, such that the free ends E2 are moved in directions away from one another. In detail, the expander component 11 may include a main portion 110, two guiding protrusions 111 and an operation portion 119. An outer diameter of the main portion 110 progressively increases in a direction away from the base portion 100, such that the main portion 110 has an inclined outer surface TS1, and an angle θ1 between the inclined outer surface TS1 and the central axis CL of the expander component 11 may be between 7.0 degrees and 8.5 degrees, inclusive. Additionally, the main portion 110 may have a screw hole H1 facing the base portion 100, and the screw hole H1 has an internal thread T1 on an inner wall thereof. The two guiding protrusions 111 are connected to one side of the main portion 110 located closer to the base portion 100, and the two guiding protrusions 111 are inserted into the two guiding grooves S2 of the base portion 100. The operation portion 119 is connected to another side of the main portion 110 located farther away from the base portion 100, and the operation portion 119 sticks out of the installation space S1 of the flexible body 10, allowing medical personnel or others to easily grip the operating portion 119 to assemble the expander component 11 into the installation space S1 of the flexible body 10. Moreover, each of the free ends E2 of the flexible arms 101 is pushed in a direction away from the central axis CL by the inclined outer surface TS1 of the main portion 110 of the expander component 11, such that the free ends E2 expand both in a horizontal direction D1 and in a vertical direction D2 perpendicular to the horizontal direction D1. In addition, each of the flexible arms 101 may have a chamfered contact surface CS facing the installation space S1 and in physical contact with the inclined outer surface TS1 of the main portion 110 of the expander component 11, so that the expander component 11 exerts pressure on the chamfered contact surfaces CS of the flexible arms 101, ensuring that the flexible arms 101 expand in desired directions, respectively. Besides, the chamfered contact surfaces CS of the flexible arms 101 may also function as guides, facilitating linear movement of the expander component 11 within the installation space S1 along a direction parallel to the central axis CL when assembling the expander component 11.

In this embodiment, by the coordination between the guiding grooves S2 of the base portion 100 of the flexible body 10 and the guiding protrusions 111 of the expander component 11, when the expander component 11 is assembled onto the flexible body 10, the expander component 11 can be guided to move linearly within the installation space S1 of the flexible body 10, and unexpected rotation of the expander component 11 within the installation space S1 can be prevented.

Furthermore, the expander component 11 may have a through-hole structure 112 and a plurality of bone-filling cavities FH1. The through-hole structure 112 penetrates through the main portion 110, and the bone-filling cavities FH1 are located on the main portion 110 and connected to the through-hole structure 112. Through this arrangement, a porosity of the main portion 110 may be 40%, enhancing the ingrowth of bone cells.

The fastener 12 includes a head portion 120 and a screw portion 121 connected to each other. The head portion 120 and the expander component 11 are located on two opposite sides of the base portion 100, respectively, the screw portion 121 has an external thread T2 on a surface thereof, and the screw portion 121 is disposed through the base portion 100 and screwed into the screw hole H1 of the main portion 110 of the expander component 11. Moreover, the external thread T2 of the screw portion 121 and the internal thread T1 of the screw hole H1 are engaged with each other, such that the screw portion 121 is screwed into the expander component 11. Furthermore, the head portion 120 of the fastener 12 may be in contact with the base portion 100.

The anti-reverse mechanism 13 is fixed to the base portion 100, and the anti-reverse mechanism 13 and the expander component 11 are located on the two opposite sides of the base portion 100, respectively, so that the anti-reverse mechanism 13 blocks one side of the head portion 120 of the fastener 12 located away from the expander component 11. In this embodiment, the base portion 100 has a fixation protrusion 1000 protruding in a direction away from the flexible arms 101, and the fixation protrusion 1000 has an external thread (not numbered). The anti-reverse mechanism 13 is, for example, a cap with an internal thread (not numbered), and the anti-reverse mechanism 13 is secured to the base portion 100 by engaging its internal thread with the external thread of the fixation protrusion 1000, such that the anti-reverse mechanism 13 blocks one side of the head portion 120 of the fastener 12 away from the expander component 11, and the head portion 120 of the fastener 12 is clamped by the anti-reverse mechanism 13 and the base portion 100. This arrangement prevents unexpected disengagement of the fastener 12 from the base portion 100, and thus prevents unexpected separation of the fastener 12 from the expander component 11, thereby ensuring a strong and stable assembly over prolonged use. It is noted that the present disclosure is not limited to the specific method described above for securing the anti-reverse mechanism to the base portion.

The assembly process of the expandable spinal implant 1 is further illustrated below. Please refer to FIG. 4 to FIG. 6, which show cross-sectional views of an assembly process of the expandable spinal implant in FIG. 1.

Figure 4:
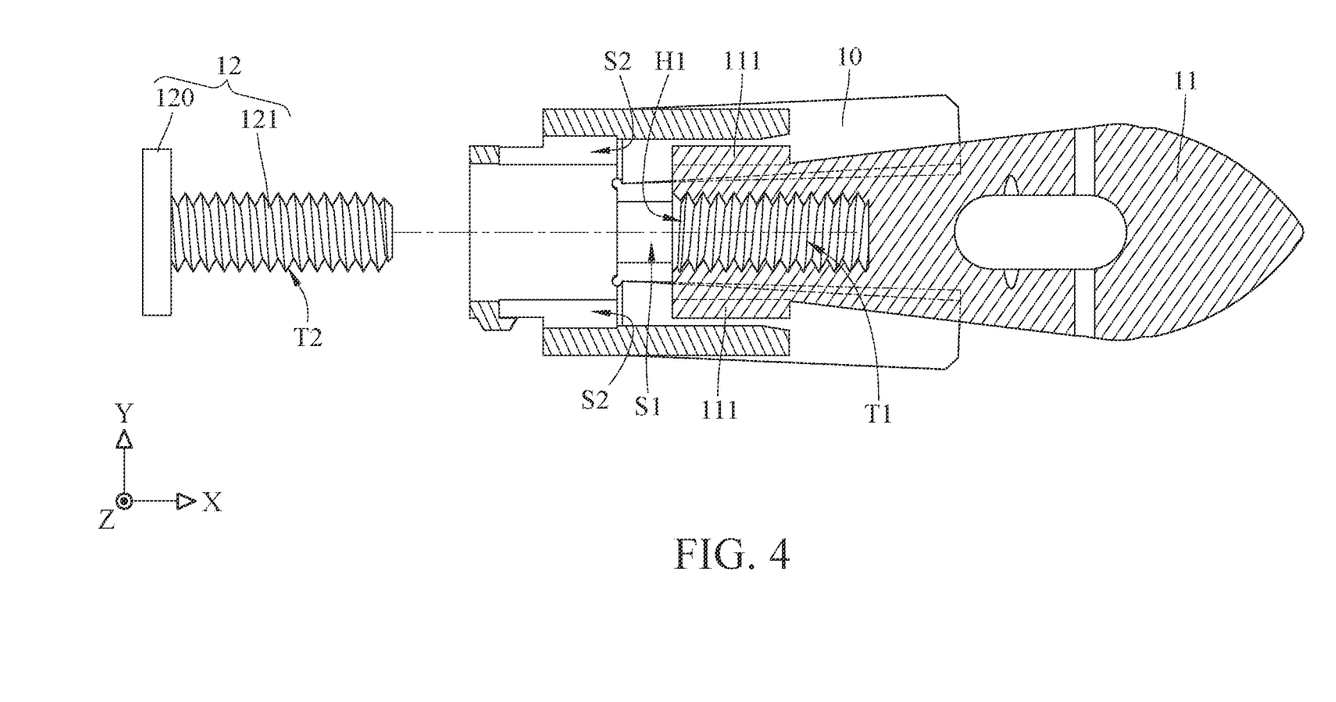
FIG. 4 to FIG. 6 show cross-sectional views of an assembly process of the expandable spinal implant in FIG. 1.

As shown in FIG. 4, first, place the expander component 11 partially into the installation space S1 of the flexible body 10 and position the expander component 11 in a pre-assembled position, and ensure that the two guiding protrusions 111 of the expander component 11 correspond to the two guiding grooves S2 of the base portion 100.

Figure 5:
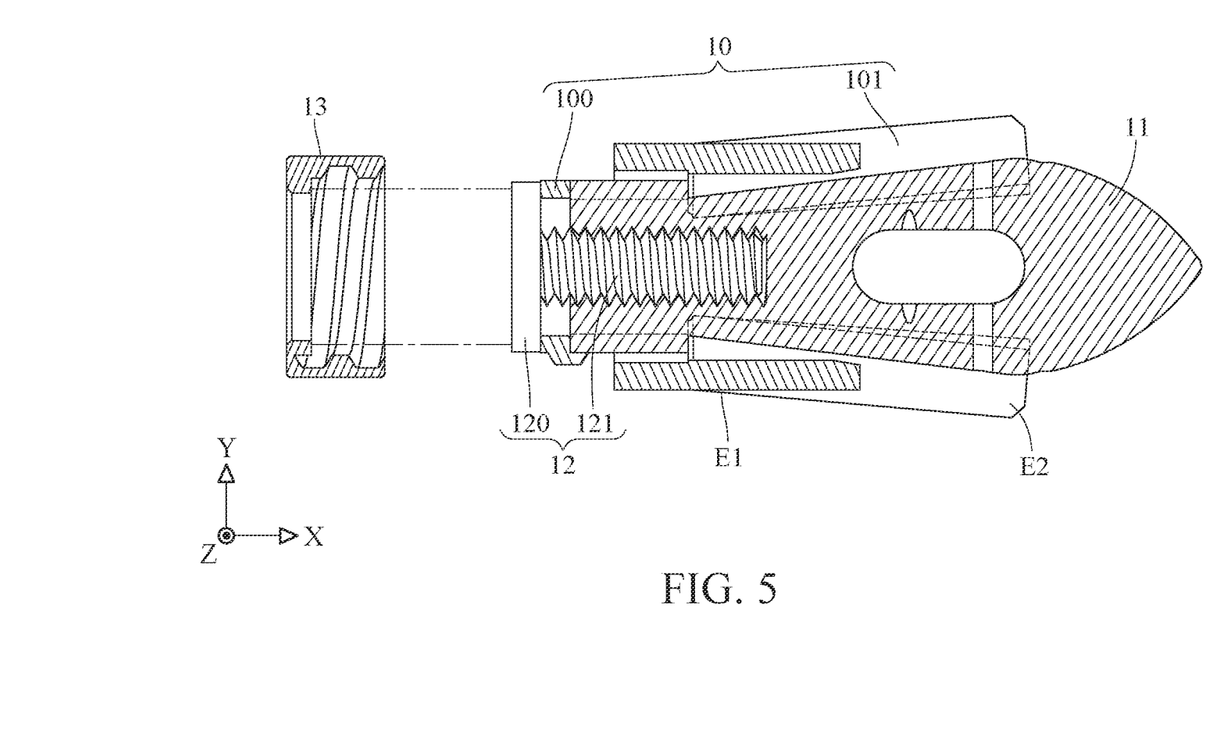

Then, insert the screw portion 121 of the fastener 12 through the base portion 100 and into the screw hole H1 of the main portion 110 of the expander component 11, and rotate the fastener 12 to drive the expander component 11 to move linearly by engaging the external thread T2 of the screw portion 121 with the internal thread T1 of the screw hole H1. Continue this rotation until the fastener 12 is securely tightened against the expander component 11, positioning the expander component 11 in an assembled position (as shown in FIG. 5). At this point, the flexible arms 101 of the flexible body 10 expand in multiple directions in both the horizontal direction D1 and the vertical direction D2 due to the pushing force from the expander component 11, making the expandable spinal implant 1 exhibit a wedge shape. Specifically, an outer diameter at the free ends E2 of the flexible arms 101 can be greater than an outer diameter at the fixed ends E1 of the flexible arms 101, enabling the correction of the physiological curvature of the spine.

Figure 6:
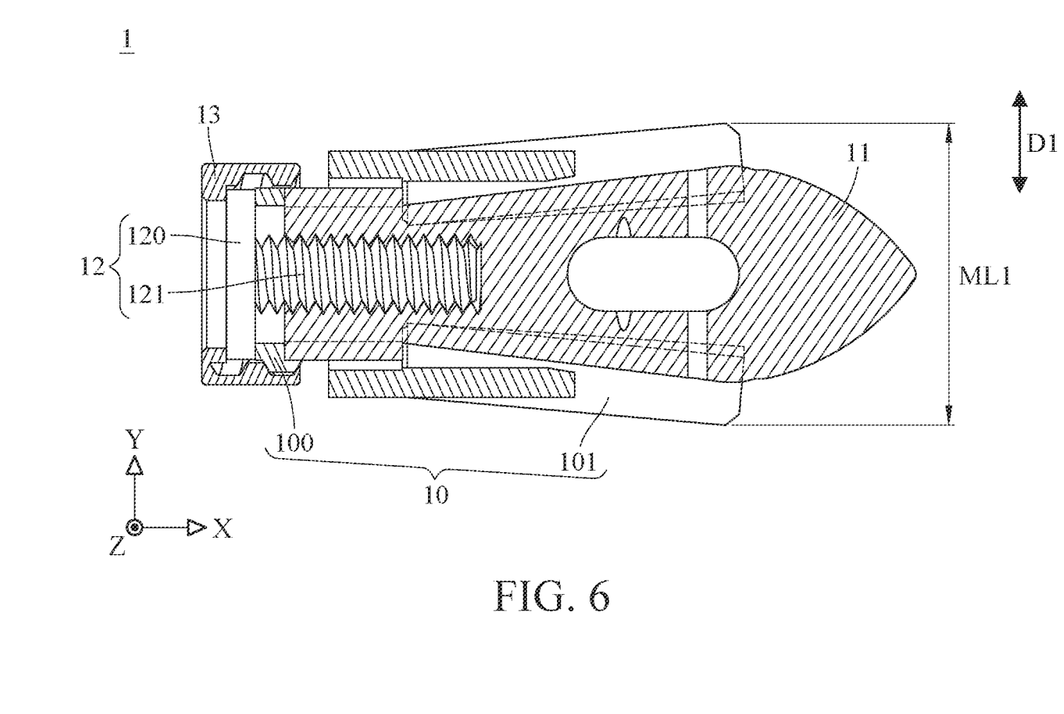

Last, as shown in FIG. 6, secure the anti-reverse mechanism 13 to the base portion 100, so that at least a part of the anti-reverse mechanism 13 blocks one side of the head portion 120 of the fastener 12 located away from the expander component 11.

In this embodiment, an outer surface of the flexible body 10 may have a porous structure. Therefore, the bonding strength between the expandable spinal implant 1 and the vertebrae can be increased. In addition, the porous structure of the flexible body 10 and the through-hole structure 112 and the bone-filling cavities FH1 of the expander component 11 provide space for bone filling, enhancing the capability for bone cell ingrowth and bone induction, and improving bone integration effectiveness.

In this embodiment, the fastener 12 may be, for example, a M3 screw, and the internal thread T1 of the screw hole H1 of the expander component 11 may be, for example, a M3 thread corresponding thereto, but the present disclosure is not limited thereto.

As shown in FIG. 3, before the expansion of the flexible arms 101, a length BL1 of the flexible body 10 in the horizontal direction D1 is, for example, 10 mm. As shown in FIG. 6, after the expansion of the flexible arms 101, according to various angle configurations where an angle θ1 between the inclined outer surface TS1 of the main portion 110 of the expander component 11 and the central axis CL of the expander component 11 can range between 7.0 degrees and 8.5 degrees (inclusive), a maximum length ML1 of the flexible body 10 in the horizontal direction D1 may range, for example, between 11.41 mm and 15.62 mm (inclusive). Therefore, an expansion ratio of the flexible body 10 in the horizontal direction D1 can be calculated to be 14.1% to 56.2%. Through the specified design ranges of angles and expansion ratios as mentioned above, expandable spinal implants in various embodiments of the present disclosure can be individually tailored for the expansion adjustment between vertebrae to specific heights and angles, allowing for the correction of the physiological curvature of the spine and reducing the probability of sinking of the expandable spinal implant.

Figure 7:
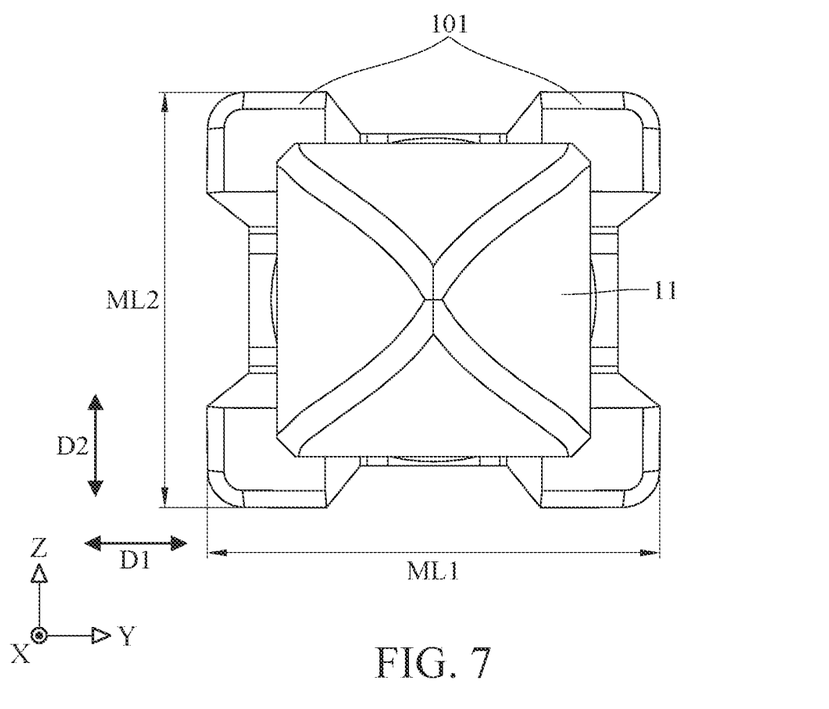
FIG. 7 is a front view of the expandable spinal implant of FIG. 1.

Please refer to FIG. 7, which is a front view of the expandable spinal implant of FIG. 1. In this embodiment, after the expansion of the flexible arms 101, the maximum length ML1 of the flexible body 10 in the horizontal direction D1 is different from a maximum length ML2 of the flexible body 10 in the vertical direction D2, but the present disclosure is not limited thereto. In other embodiments, the maximum length of the flexible body in the horizontal direction may be the same as the maximum length of the flexible body in the vertical direction. Furthermore, in this embodiment, a shape of the flexible body 10 is a rectangular column, but the present disclosure is not limited thereto. In other embodiments, the shape of the flexible body may be cylindrical.

Figure 8:
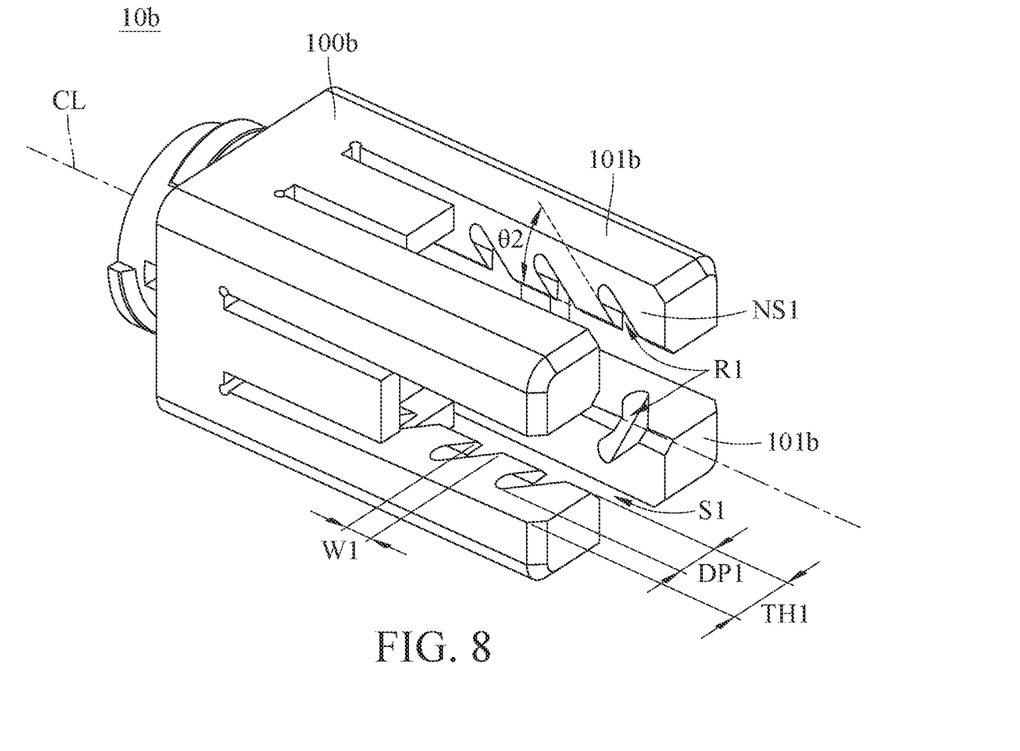
FIG. 8 is a perspective view of a flexible body of an expandable spinal implant in accordance with the second embodiment of the disclosure.

Please refer to FIG. 8, which is a perspective view of a flexible body of an expandable spinal implant in accordance with the second embodiment of the disclosure. In this embodiment (corresponding to FIG. 8), an expandable spinal implant is similar to the expandable spinal implant 1 in FIG. 1 as described above. The same reference numerals indicate the same components, and functions and effects provided by those components are the same as described above, so an explanation in this regard will not be provided again.

In this embodiment, each of flexible arms 101b of a flexible body 10b has a plurality of cut grooves R1 on an inner surface NS1 thereof located adjacent to the installation space S1, where the cut grooves R1 are inclined with respect to the inner surface NS1, and the cut grooves R1 slantingly extend from the inner surface NS1 in a direction towards a base portion 100b. Moreover, before the expansion of the flexible arms 101b, an angle θ2 between an extension direction of the cut grooves R1 and the central axis CL may range, for example, between 35 degrees and 55 degrees (inclusive), and a depth DPI of each of the cut grooves R1 may be, for example, 51% to 80% (inclusive) of a thickness TH1 of each of the flexible arms 101b. In addition, an opening width W1 of each of the cut grooves R1 may be, for example, 0.2 mm.

By incorporating the cut grooves R1 inclined in a forward direction on the flexible arms 101b, a friction between the flexible arms 101b and an expander component can be increased, which facilitates easier expansion of the flexible arms 101b of the flexible body 10b, and the expander component is less prone to extracting from the installation space S1 of the flexible body 10b. Therefore, it is advantageous for securing the expander component in place.

Figure 9:
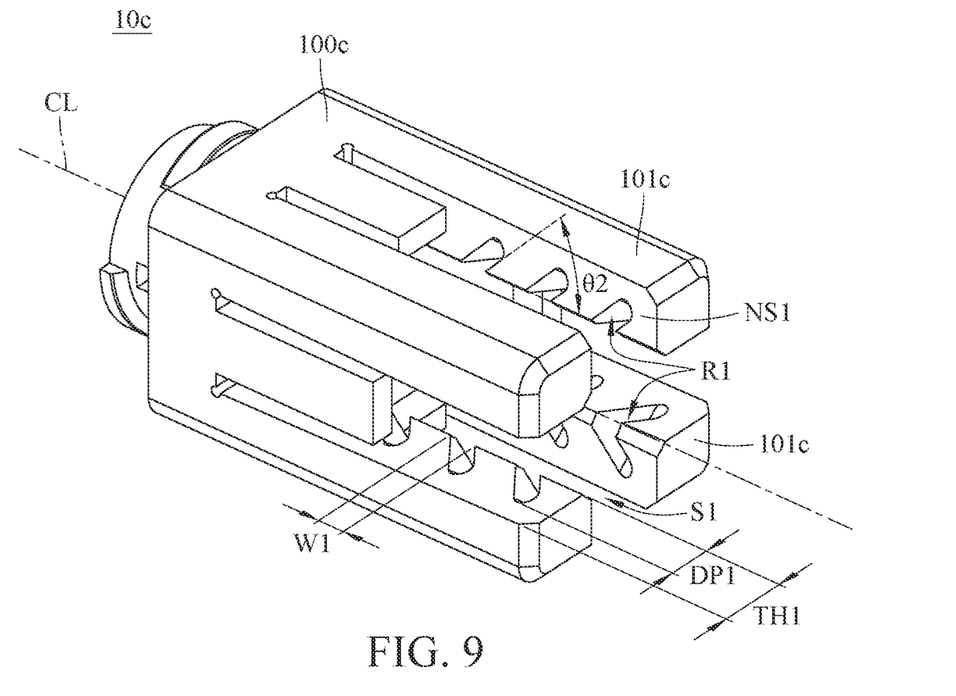
FIG. 9 is a perspective view of a flexible body of an expandable spinal implant in accordance with the third embodiment of the disclosure.

Please refer to FIG. 9, which is a perspective view of a flexible body of an expandable spinal implant in accordance with the third embodiment of the disclosure. In this embodiment (corresponding to FIG. 9), an expandable spinal implant is similar to the expandable spinal implant 1 in FIG. 1 as described above. The same reference numerals indicate the same components, and functions and effects provided by those components are the same as described above, so an explanation in this regard will not be provided again.

In this embodiment, each of flexible arms 101c of a flexible body 10c has a plurality of cut grooves R1 on an inner surface NS1 thereof located adjacent to the installation space S1, where the cut grooves R1 are inclined with respect to the inner surface NS1, and the cut grooves R1 slantingly extend from the inner surface NS1 in a direction away from a base portion 100c. Moreover, before the expansion of the flexible arms 101c, an angle θ2 between an extension direction of the cut grooves R1 and the central axis CL may range, for example, between 35 degrees and 55 degrees (inclusive), and a depth DPI of each of the cut grooves R1 may be, for example, 51% to 80% (inclusive) of a thickness TH1 of each of the flexible arms 101c. In addition, an opening width W1 of each of the cut grooves R1 may be, for example, 0.2 mm.

By incorporating the cut grooves R1 inclined in a reverse direction on the flexible arms 101c, a friction between the flexible arms 101c and an expander component can be increased.

Figure 10:
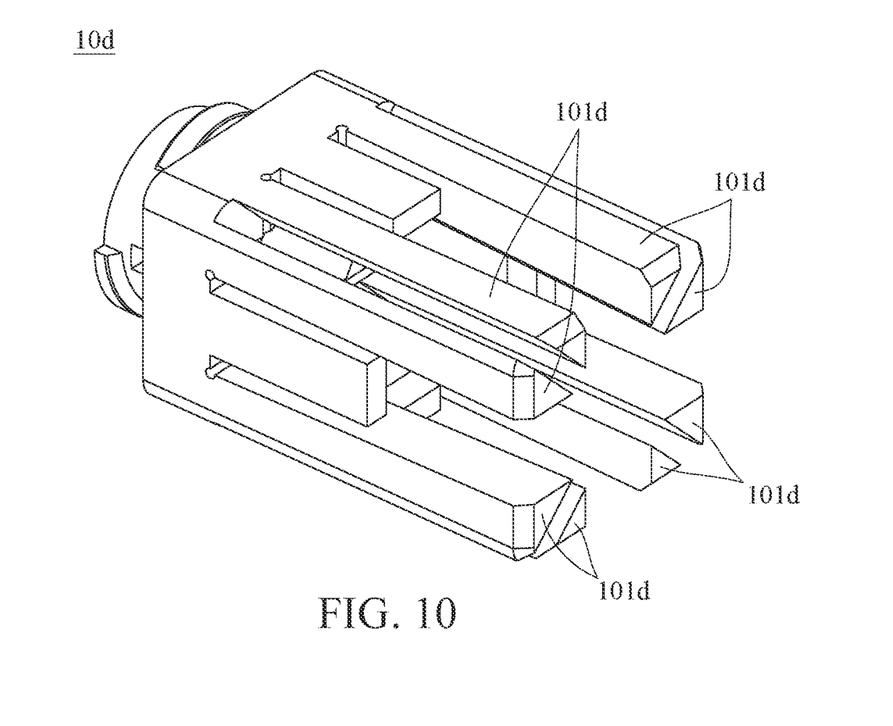
FIG. 10 is a perspective view of a flexible body of an expandable spinal implant in accordance with the fourth embodiment of the disclosure.

In the above embodiments, the quantity of the flexible arms of the flexible body is four, but the present disclosure is not limited to the quantity of the flexible arms. For example, please refer to FIG. 10, which is a perspective view of a flexible body of an expandable spinal implant in accordance with the fourth embodiment of the disclosure. In this embodiment (corresponding to FIG. 10), an expandable spinal implant is similar to the expandable spinal implant 1 in FIG. 1 as described above. The same reference numerals indicate the same components, and functions and effects provided by those components are the same as described above, so an explanation in this regard will not be provided again. In this embodiment, the quantity of the flexible arms 101d of the flexible body 10d is eight.

In view of the above description, by inserting the expander component between the flexible arms of the flexible body, the flexible arms expand in multiple directions, increasing the contact area between the expandable spinal implant and the vertebrae, and the overall structural strength can be enhanced, thereby preventing the expandable spinal implant from sinking due to compression from the vertebrae. Additionally, by the anti-reverse mechanism blocking the fastener, unexpected disengagement of the fastener from the base portion of the flexible body can be prevented, thereby preventing unexpected separation of the fastener from the expander component.

It will be apparent to those skilled in the art that various modifications and variations can be made to the disclosed embodiments. It is intended that the specification and examples be considered as exemplars only, with a true scope of the disclosure being indicated by the following claims and their equivalents.

What is claimed is:

1. An expandable spinal implant, configured to be inserted between two vertebrae, comprising:
    a flexible body comprising a base portion and a plurality of flexible arms, each of the plurality of flexible arms having a fixed end and a free end opposite to each other, the fixed ends of the plurality of flexible arms connected to the base portion, and the plurality of flexible arms collectively surrounding an installation space;
    an expander component partially disposed in the installation space and exerting pressure on the free ends of the plurality of flexible arms, such that the free ends are moved in directions away from one another;
    a fastener comprising a head portion and a screw portion connected to each other, the head portion and the expander component located on two opposite sides of the base portion, respectively, and the screw portion disposed through the base portion and irremovably screwed into the expander component; and
    an anti-reverse mechanism fixed to the base portion, the anti-reverse mechanism and the expander component located on the two opposite sides of the base portion, respectively, and the anti-reverse mechanism blocking one side of the head portion of the fastener located away from the expander component;
    wherein the expander component has a screw hole, the screw hole is located in the base portion, and the screw portion of the fastener is inserted into the screw hole.

2. The expandable spinal implant according to claim 1, wherein the screw hole has an internal thread on an inner wall thereof, the screw portion of the fastener has an external thread on a surface thereof, and the external thread and the internal thread are engaged with each other.

3. The expandable spinal implant according to claim 1, wherein the free ends of the plurality of flexible arms expand both in a horizontal direction and in a vertical direction perpendicular to the horizontal direction.

4. The expandable spinal implant according to claim 1, wherein the flexible body has a porous structure on an outer surface thereof.

5. The expandable spinal implant according to claim 1, wherein each of the plurality of flexible arms has a plurality of cut grooves on an inner surface thereof located adjacent to the installation space.

6. The expandable spinal implant according to claim 5, wherein the plurality of cut grooves are inclined with respect to the inner surface, and the plurality of cut grooves slantingly extend from the inner surface in a direction towards the base portion.

7. The expandable spinal implant according to claim 5, wherein the plurality of cut grooves are inclined with respect to the inner surface, and the plurality of cut grooves slanting extend from the inner surface in a direction away from the base portion.

8. The expandable spinal implant according to claim 5, wherein an angle between an extension direction of the plurality of cut grooves and a central axis of the expander component is between 35 degrees and 55 degrees, inclusive.

9. The expandable spinal implant according to claim 5, wherein a depth of each of the plurality of cut grooves is 51% to 80%, inclusive, of a thickness of each of the plurality of flexible arms, and an opening width of each of the plurality of cut grooves is 0.2 mm.

10. The expandable spinal implant according to claim 1, wherein the base portion of the flexible body has a guiding groove connected to the installation space, the expander component comprises a main portion and a guiding protrusion, the guiding protrusion is connected to the main portion, and the guiding protrusion is inserted into the guiding groove.

11. The expandable spinal implant according to claim 1, wherein the flexible body further comprises a plurality of rigid side plates, the plurality of rigid side plates are connected to the base portion, and each of the plurality of rigid side plates is located between adjacent two of the plurality of flexible arms.

12. The expandable spinal implant according to claim 1, wherein a quantity of the plurality of flexible arms is four or eight.

13. The expandable spinal implant according to claim 1, wherein the expander component comprises a main portion, and an outer diameter of the main portion progressively increases in a direction away from the base portion.

14. The expandable spinal implant according to claim 1, wherein the expander component comprises a main portion, the expander component has a through-hole structure and a plurality of bone-filling cavities, the through-hole structure penetrates through the main portion, and the plurality of bone-filling cavities are located on the main portion and connected to the through-hole structure.

15. The expandable spinal implant according to claim 14, wherein a porosity of the main portion is 40%.

16. The expandable spinal implant according to claim 1, wherein the expander component comprises a main portion, the main portion has an inclined outer surface, and an angle between the inclined outer surface and a central axis of the expander component is between 7.0 degrees and 8.5 degrees, inclusive.

17. The expandable spinal implant according to claim 1, wherein the expander component comprises a metallic material, and the flexible body comprises a polymeric material.

* * * * *